US008899956B2

(12) United States Patent
Hegler

(10) Patent No.: US 8,899,956 B2
(45) Date of Patent: Dec. 2, 2014

(54) DEVICE FOR PRODUCING PIPES MADE OF THERMOPLASTIC

(76) Inventor: Ralph Hegler, Bad Kissingen (DE)

(*) Notice: Subject to any disclaimer, the term of this patent is extended or adjusted under 35 U.S.C. 154(b) by 450 days.

(21) Appl. No.: 13/293,790

(22) Filed: Nov. 10, 2011

(65) Prior Publication Data
US 2012/0121750 A1 May 17, 2012

(30) Foreign Application Priority Data
Nov. 11, 2010 (DE) .......... 10 2010 043 786

(51) Int. Cl.
| | |
|---|---|
| B29C 33/36 | (2006.01) |
| B29C 47/12 | (2006.01) |
| B29C 47/00 | (2006.01) |
| B29C 47/08 | (2006.01) |
| B29C 49/00 | (2006.01) |
| B29C 47/06 | (2006.01) |
| B29C 47/32 | (2006.01) |
| B29C 47/56 | (2006.01) |
| B29C 47/70 | (2006.01) |
| B29C 47/86 | (2006.01) |
| B29C 47/90 | (2006.01) |
| B29C 47/92 | (2006.01) |
| B29C 49/42 | (2006.01) |
| B29L 16/00 | (2006.01) |
| B29L 23/18 | (2006.01) |

(52) U.S. Cl.
CPC .......... *B29C 47/126* (2013.01); *B29C 47/0033* (2013.01); *B29C 47/0818* (2013.01); *B29C 49/0026* (2013.01); *B29C 47/0023* (2013.01); *B29C 47/005* (2013.01); *B29C 47/065* (2013.01); *B29C 47/0808* (2013.01); *B29C 47/32* (2013.01); *B29C 47/56* (2013.01); *B29C 47/70* (2013.01); *B29C 47/86* (2013.01); *B29C 47/902* (2013.01); *B29C 47/92* (2013.01); *B29C 2049/4294* (2013.01); *B29C 2791/006* (2013.01); *B29L 2016/00* (2013.01); *B29L 2023/18* (2013.01)
USPC ........... 425/185; 425/233; 425/336; 425/395; 425/396

(58) Field of Classification Search
USPC ......... 425/185, 336, 337, 369, 395, 396, 186, 425/233
See application file for complete search history.

(56) References Cited

U.S. PATENT DOCUMENTS

| | | | |
|---|---|---|---|
| 4,212,618 A | 7/1980 | Hegler et al. | |
| 5,320,797 A | 6/1994 | Hegler et al. | |
| 5,645,871 A * | 7/1997 | Berns et al. | 425/326.1 |
| 5,693,347 A | 12/1997 | Hegler | |
| 7,074,027 B2 * | 7/2006 | Starita | 425/133.1 |
| 2009/0091055 A1 * | 4/2009 | Hegler | 425/113 |

FOREIGN PATENT DOCUMENTS

EP 2116352 A1 11/2009

* cited by examiner

*Primary Examiner* — Joseph S Del Sole
*Assistant Examiner* — Thukhanh Nguyen
(74) *Attorney, Agent, or Firm* — James B. Conte; Husch Blackwell LLP

(57) ABSTRACT

A device for producing pipes made of thermoplastic with annular transverse profilings with a cross section in the form of undulation peaks and undulation troughs has half-molds, which complete one another pairwise along a straight mold section to form a closed mold, which can be moved in a movement direction. Projecting into the mold is an extrusion tool, which has a nozzle support body. To produce an adequate seal between the half-molds and nozzle support body, the latter is covered with exchangeably attached hollow half-shells, which form a cylindrical external face.

9 Claims, 4 Drawing Sheets

DEVICE FOR PRODUCING PIPES MADE OF THERMOPLASTIC

CROSS-REFERENCES TO RELATED APPLICATIONS

This application claims the priority of German Patent Application, Serial No. 10 2010 043 786.7, filed Nov. 11, 2010, pursuant to 35 U.S.C. 119(a)-(d), the content of which is incorporated herein by reference in its entirety as if fully set forth herein.

FIELD OF THE INVENTION

The invention relates to a device for producing pipes made of thermoplastic with annular transverse profilings with a cross section in the form of undulation peaks and undulation troughs, with half-moulds, which complete one another pairwise along a straight mould section to form a closed mould, which is moveable in a motion direction, with a central longitudinal axis, which is transportable in the circuit counter to the movement direction of the mould to an upstream end of the mould section and which have an annular internal profiling, which is loadable with a partial vacuum, with a smallest internal diameter D39 to produce the transverse profiling, and with an extrusion tool, which has a nozzle support body with one of an external diameter D33 and D33' with at least one channel for plastic melt, which has a nozzle with a diameter D19, which is connected by means of a channel end portion widening toward the nozzle to the channel, which has an inner nozzle ring and an outer nozzle ring, which between them limit the channel end portion and which are fastened to the nozzle support body,

BACKGROUND OF THE INVENTION

Devices of this type known, for example, from EP 2 116 352 B1 or U.S. Pat. No. 5,320,797 have been extraordinarily successful in practice. In the configuration of devices of this type for producing pipes with a nominal width ≥400, the problem emerges that the extrusion tool, also designated a pipe head, becomes very heavy, which leads to not inconsiderable additional structural outlay and additional costs resulting from this.

SUMMARY OF THE INVENTION

The invention is based on an object of configuring a device of the generic type in such a way that even in a configuration for large nominal widths, the weight of the extrusion tool is as small as possible, without endangering the sealing of the mould to the outside to maintain the partial vacuum.

This object is achieved according to the invention by the external diameter D33 or D33' being smaller than the internal diameter D19, wherein the nozzle support body—in relation to the movement direction—upstream of the outer nozzle ring, is covered with exchangeably attached hollow half-shells, which form a cylindrical external face with a diameter D37 and wherein a narrow annular gap with a gap width a is formed between the cylindrical external face and the internal profiling with the smallest internal diameter D39. Between the cylindrical external face formed by the half-shells and the internal profilings of the smallest diameter generally formed by mould webs, only a narrow annular gap is limited, which acts as a restrictor point and therefore prevents an increase in pressure relevant to the process in the region of the partial vacuum. One or more annular gaps of this type are generally sufficient to maintain the partial vacuum; in addition, however, by the seals projecting outwardly over the external face, which is bringable into sealing abutment with the internal profiling with the smallest internal diameter D39, being provided on the half-shells, an additional seal can also be achieved, with a plurality of seals being provided at a spacing c in the direction of the centre longitudinal axis such that at least one seal always rests in a sealing manner on an internal profiling with the smallest diameter D39 being particularly advantageous.

Further features, advantages and details emerge from the following descriptions of two embodiments of the invention with the aid of the drawings.

DESCRIPTION OF THE PREFERRED EMBODIMENTS

Figure 1:
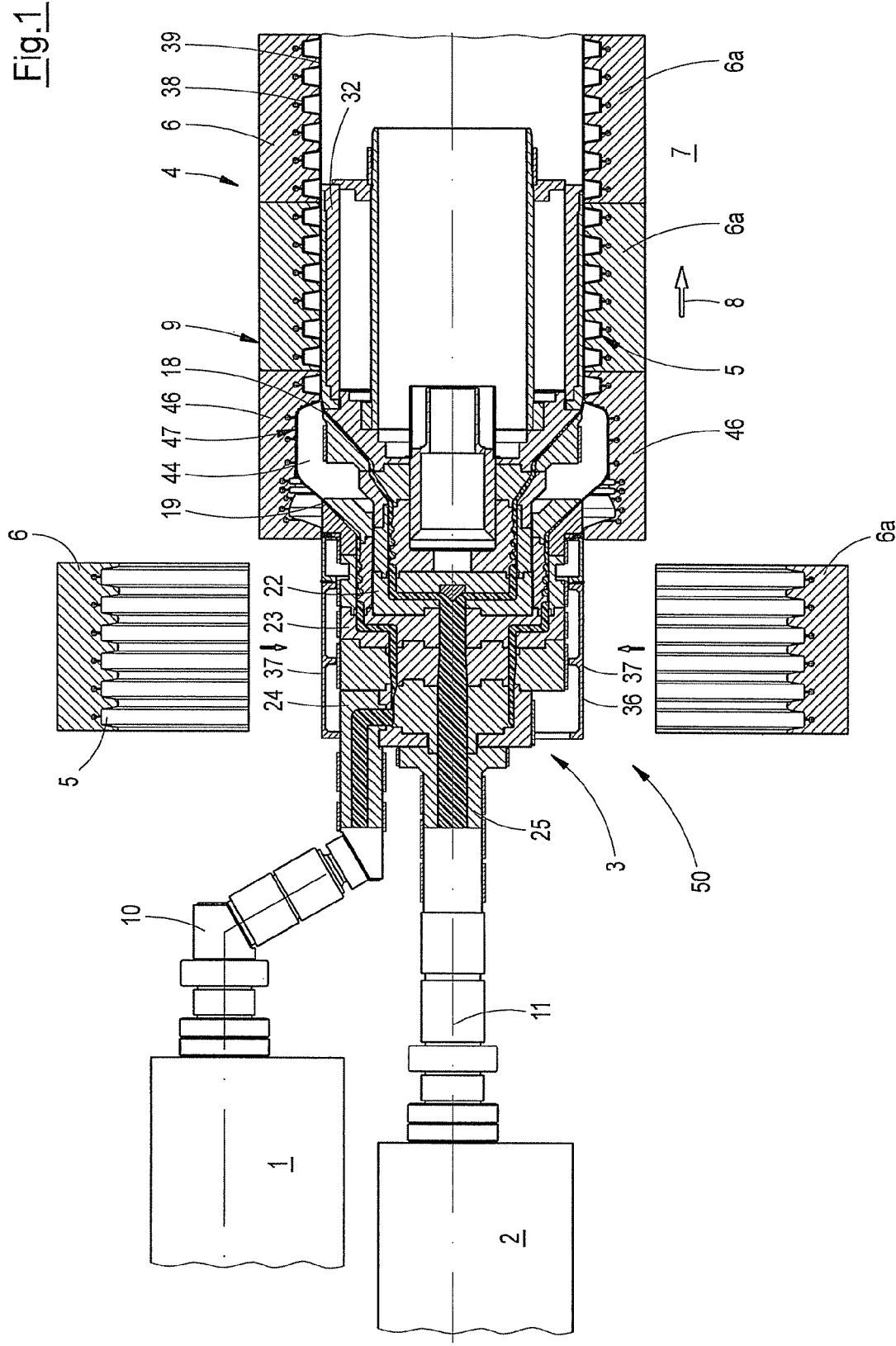
FIG. 1 shows a device for producing a composite pipe in a schematic partial view.

As FIG. 1 allows it to be seen, a device for producing plastics material composite pipes with transverse grooves has two extruders 1, 2, which are connected to an extrusion tool 3, which in practice is also called a pipe head. From the extrusion tool 3, two tubes of plastics material melt are coextruded within one another, from which the composite pipe mentioned is molded. Used for this purpose is a mould machine 4, in practice also called a corrugator, which is formed from half-moulds 6, 6a, which are provided with an internal profiling 5, are set against one another pairwise on a mould section 7 and are located tightly against one another in a movement direction 8 of the mould 9 thus formed. The composite pipes mentioned are molded in the mould 9. This method is generally known in practice and shown and described, for example, in U.S. Pat. No. 5,693,347, to which reference may be made for explanation.

The extruder 1 is a so-called side extruder, because it opens by means of a lateral melt line 10 into the extrusion tool 3, while the other extruder 2 opens centrally, i.e. concentrically with respect to the centre longitudinal axis 11 of the mould 9 into the extrusion tool 3.

The extrusion tool 3 has an internal nozzle mandrel 12, which is screwed together from a plurality of parts and is arranged concentrically with respect to the axis 11. The internal nozzle mandrel 12 is surrounded by an internal nozzle jacket 13, which is also multi-part and is also in turn surrounded concentrically with respect to the axis 11 by an external nozzle mandrel 14. The latter is in turn surrounded by an external nozzle jacket 15. An internal channel 16 configured concentrically with respect to the axis 11 is limited between the internal nozzle mandrel 12 and the internal nozzle jacket 13, while an external channel 17 is limited between the external nozzle mandrel 14 and the external nozzle jacket 15. The internal channel 16 opens by means of an internal nozzle 18 out of the extrusion tool 3, while the external channel 17 opens by means of an external nozzle 19 out of the extrusion tool 3. Extruded from the two nozzles 18, 19 are the internal tube 20 mentioned and the external tube 21 mentioned, which are connected to one another to form a composite pipe in a manner known, for example, from U.S. Pat. No. 5,320,797. The internal nozzle mandrel 12, the internal nozzle jacket 13, the external nozzle mandrel 14 and the external nozzle jacket 15 are fastened with the interposition of an internal star distributor 22 and an external star distributor 23 and a sleeve tool 24 to a support part 25. In the region of this support part 25, the extrusion tool 3 is supported by means of a support construction, not shown, on a base, also not shown, as is conventional in practice. The melt line 10 from the side extruder 1 opens into the sleeve tool 24, as can be inferred from FIG. 1. The details of the star distributors 22, 23 and the sleeve tool 24 are shown and described in detail, for example, in EP 2 116 352 B1, to which reference is made.

The internal nozzle 18 is limited by an inner internal nozzle ring 26 and an outer internal nozzle ring 27, which limit an internal channel end portion 28 connecting the internal channel 16 to the actual internal nozzle 18 and widening in a funnel shape to the internal nozzle 18. The external nozzle 19 is limited by an inner external nozzle ring 29 and an outer external nozzle ring 30, which also limit an external channel end portion 31 widening outwardly in a funnel shape, specifically toward the external nozzle 19. The inner internal nozzle ring 26 is attached to the internal nozzle mandrel 12. The outer internal nozzle ring 27 is attached to the internal nozzle jacket 13. The inner external nozzle ring 29 is attached to the external nozzle mandrel 14. The outer external nozzle ring 30 is fastened to the external nozzle jacket 15. A cooling and calibrating mandrel 32 is attached to the inner internal nozzle ring 26.

The internal nozzle 18 has a diameter D18, while the external nozzle 19 has a diameter D19. The portion of the extrusion tool 3 surrounded by the external nozzle jacket 15 and designated the nozzle support body 33 has an external diameter D33, which is significantly smaller than D18 and D19. The external nozzle jacket 15 is surrounded by heating devices 34 configured in the form of heating strips. The outer internal nozzle ring 27 can also be surrounded by a corresponding heating device 35.

The nozzle support body 33 is surrounded by thin-walled half-shells 36 made of aluminum, which surround the nozzle support body 33 with a continuous cylindrical external face 37. The diameter D37 of this cylindrical external face 37 substantially corresponds to the diameter D19 of the external nozzle 19. If tubes with a larger diameter D18 and D19 are to be extruded, the nozzle rings 26, 27, 29, 30 are exchanged. Accordingly, the half-shells 36 are replaced by half-shells with a larger diameter. The remaining nozzle support body 33 remains unchanged. The nozzle support body 33 can thus remain unchanged, in each case, even when producing pipes with a different nominal width. It is adapted to the pipe to be produced with the smallest possible nominal width.

Figure 2:
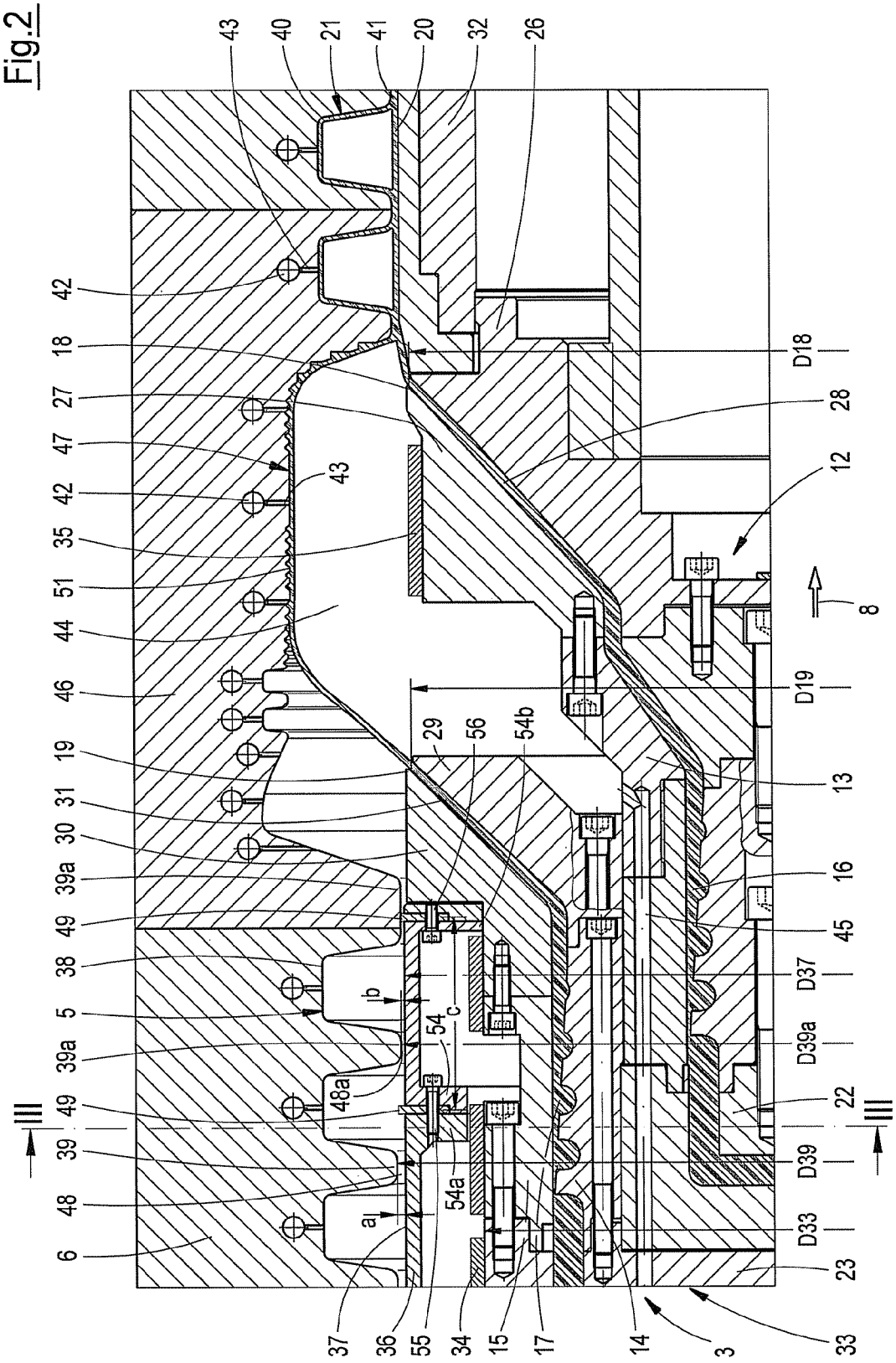
FIG. 2 shows a partial longitudinal section through the device according to FIG. 1.

As can be inferred from FIG. 2, the internal profiling 5 of the half-moulds 6, 6a consists of annular mould recesses 38, between which likewise annular mould webs 39 with the smallest internal diameter D39 are also configured, in each case. The external tube 21 is formed into undulation peaks 40 in the mould recesses 38, while the external tube 21 is formed into undulation troughs 41 of the external tube 21 by the mould webs 39.

The internal tube 20 is welded to the external tube 21 on the cooling and calibrating mandrel 32 in the region of the undulation troughs 41. This method is known in detail, for example, from U.S. Pat. No. 5,320,797, already mentioned. The mould recesses 38 are loaded with a partial vacuum by vacuum channels 42, which are configured in the half-moulds 6, 6a and are connected by vacuum slots 43 to the respective mould recesses 38. Either support air with the required excess pressure relative to the atmospheric pressure is introduced into the space 44 between the tubes 20, 21 or else this space 44 is vented to the outside. Both take place by means of a gas channel 45. If a pipe socket 51 is to be formed at fixed intervals in a composite pipe to be continuously produced, half-moulds 46 having a corresponding socket recess 47 are then used, which is also shown in FIG. 2. These half-moulds 46 are also provided with corresponding vacuum channels 42, from which vacuum slots 43 lead into the socket recess 47. The forming of the external tube 21 into undulation peaks 40 or pipe sockets 51 takes place as described above. It can thus—as shown above—take place by the so-called vacuum method or else the combined blow molding-vacuum method.

As can be inferred from FIG. 2, only a narrow annular gap 48 with a gap width a of 2 mm to 10 mm exists between the mould webs 39 of the half-moulds 6, 6a and the cylindrical external face 37 of the half-shells 36. Configured between the two mould webs 39a, which—in relation to the movement direction 8—directly follow the socket recess 47, and the cylindrical external face 37 is, in each case, an annular gap 48a with the gap width b, to which there applies: 2 mm≤b≤5 mm. The reason is that the undulating portion of the pipe directly adjoining the pipe socket 51 is cut out after production. The restriction can therefore be increased, without the composite pipe being weakened in the undulation trough 41. The internal diameter D39a of these mould webs 39a is thus generally slightly smaller than the internal diameter D39. In addition, seals 49 projecting radially slightly outwardly and made of a suitable plastics material can be attached to the half-shells 36 and in each case engage with the mould webs 39 upon movement of the mould 9 in the direction 8, thereby forming a complete seal. If a plurality of lamellar-like seals 49 of this type is provided, it is expedient to select the spacing c thereof in the movement direction 8 in such a way that at least one seal 49 in each case always rests on a mould web 39 or 39a. Independently of these seals 49, the annular gaps 48 or 48a can be selected to be so narrow that the partial vacuum built up by means of the vacuum channels 42 and the vacuum slots 43 between the mould recesses 38 or the socket recess 47 and the external tube 21 is also maintained. The external tube 21 is thus reliably held on the internal profiling 5 of the mould 9 or placed there in the course of the pipe production.

As soon as the internal tube 20 is placed against the external tube 21 at least partially preformed in the socket recess 47 for the pipe socket 51, the pair of half-moulds 6, 6a following the pair of half-moulds 46 having the socket recess 47 is already placed on the pair of half-moulds 46. An adequate number of restrictor points is thus produced as soon as the venting between the external tube 21 and the internal tube 20 begins.

So that the mould 9 is already closed off with an adequate spacing upstream of the external nozzle 19 and therefore also of the internal nozzle 18, in other words can maintain the partial vacuum in the manner described, it is expedient if the half-moulds 6, 6a or 46 are transported after removal from the mould section 7 and back to the upstream end 50 of the mould section 7 in the manner indicated in FIG. 1. The respective half-moulds 6, 6a and, accordingly, the half-moulds 46, after the return transport, are returned transverse to the movement direction 8 of the mould back into the mould section 7, whereby the corresponding seal relative to the cylindrical external face 37 formed by the half-shells 36 is immediately achieved. The details of this transportation are shown and described in U.S. Pat. No. 5,693,347 A and U.S. Pat. No. 4,212,618 A, to which reference may be made.

Figure 3:
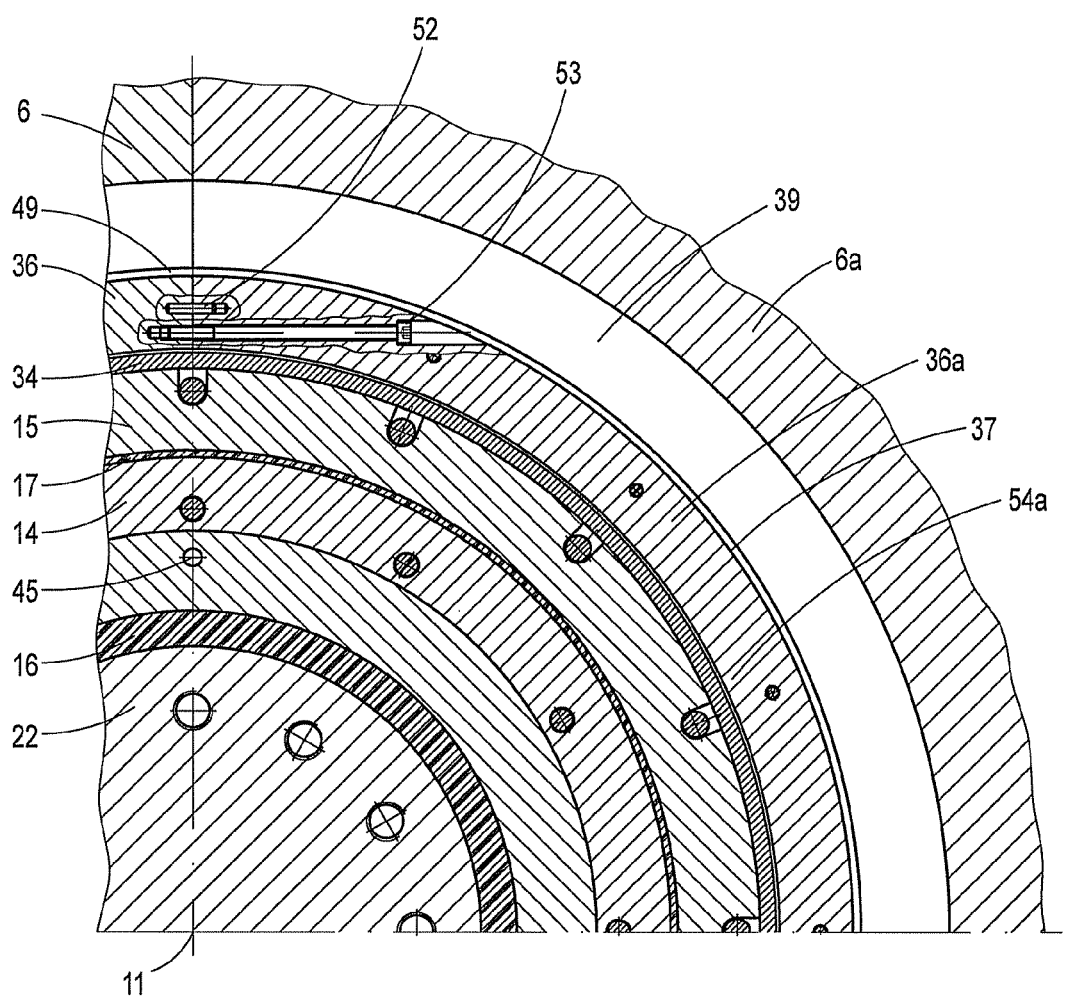
FIG. 3 shows a partial cross section through the device according to FIG. 2 in accordance with the section line in FIG. 2

As emerges, in particular from FIG. 3, two respective half-shells 36, 36a are positioned and centered with respect to one another by means of adjusting pins 52 and connected to one another by means of screws 53, whereby two half-shells 36 and 36a in each case extend over the full periphery, in other words form a type of pipe portion.

The half-shells 36 and 36a in each case have flanges 54, 54a, 54b at their ends, two flanges 54, 54a resting against one another in the direction of the axis 11 in each case being connected to one another by means of screws 55. The entirety of the half-shells 36, 36a is supported by means of the individual flanges 54, 54a, 54b relative to the nozzle support body 33 in the radial direction and mounted by means of the screws 53 on the external nozzle ring 30.

The seals 49 are in each case arranged in the joint between two flanges 54 or 54a resting against one another in the axial direction and clamped by means of the screws 55 and 56.

Figure 4:
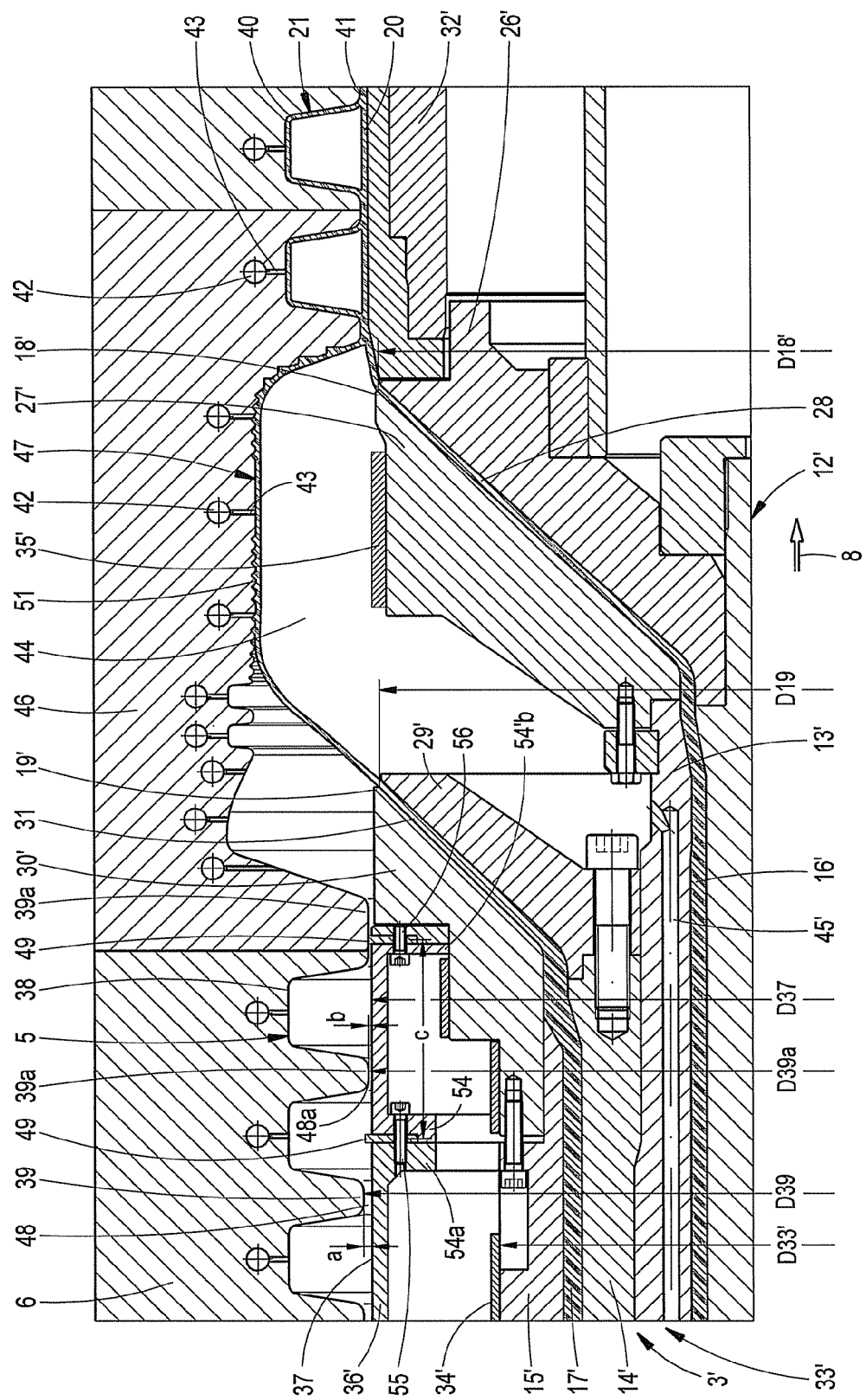
FIG. 4 shows a partial longitudinal section in accordance with the view in FIG. 2 with a modified extrusion tool.

The embodiment according to FIG. 4 differs from that according to FIG. 2 only with respect to structural details. Structurally identical parts are therefore provided with the same reference numerals as in FIG. 2. If the parts are functionally the same but structurally slightly different, the parts are designated by the same reference numerals as in FIG. 2 but with an apostrophe. Reference can therefore entirely be made to the above description.

What is claimed is:

1. A device for producing pipes made of thermoplastic with annular transverse profilings with a cross section in the form of undulation peaks and undulation troughs,
   with half-moulds,
      which complete one another pairwise along a straight mould section to form a closed mould, which is moveable in a motion direction, with a central longitudinal axis,
      which is transportable in the circuit counter to the movement direction of the mould to an upstream end of the mould section and
      which have an annular internal profiling, which is loadable with a partial vacuum, with a smallest internal diameter D39 to produce the transverse profiling, and
   with an extrusion tool,
      which has a nozzle support body with one of an external diameter D33 and D33' with at least one channel for plastic melt,
      which has a nozzle with a diameter D19, which is connected by means of a channel end portion (31) widening toward the nozzle to the channel,
      which has an inner nozzle ring and an outer nozzle ring, which between them limit the channel end portion (31) and which are fastened to the nozzle support body,
   wherein one of the external diameter D33 and D33' of the nozzle support body is smaller than the diameter D19 of the nozzle,
   wherein the nozzle support body—in relation to the movement direction (8)—upstream of the outer nozzle ring (30), is covered with exchangeably attached hollow half-shells, which form a cylindrical external face with a diameter D37 and
   wherein a narrow annular gap with a gap width a is formed between the cylindrical external face and the internal profiling with the smallest internal diameter D39.

2. A device according to claim 1,
   wherein there applies to the gap width a: $2\ mm \leq a \leq 10\ mm$.

3. A device according to claim 1,
   wherein seals projecting outwardly over the external face, which is bringable into sealing abutment with the internal profiling with the smallest internal diameter D39, are provided on the half-shells.

4. A device according to claim 3,
   wherein a plurality of seals are provided at a spacing c in the direction of the centre longitudinal axis such that at least one seal always rests in a sealing manner on an internal profiling with the smallest diameter D39.

5. A device according to claim 1,
   wherein the internal profiling with the smallest internal diameter D39 is formed by mould webs.

6. A device according to claim 1,
   wherein the half-shells consist of one of the group of aluminum and an aluminum alloy.

7. A device according to claim 1,
   wherein heating devices are attached to the nozzle support body within the half-shells.

8. A device according to claim 1,
   wherein a socket recess is configured in a least one pair of half-moulds and
   wherein—in relation to the movement direction of the socket recess—directly following, the internal profiling is configured as at least one mould web with a smallest internal diameter D39a, which limits an annular gap with respect to the cylindrical external flank with a gap width b, to which there applies $2\ mm \leq b \leq 5\ mm$.

9. A device according to claim 8,
   wherein one to three mould webs are provided.

* * * * *